Sept. 19, 1961 H. GENA 3,000,232
LOCKING CONTROL DEVICE
Filed July 27, 1960
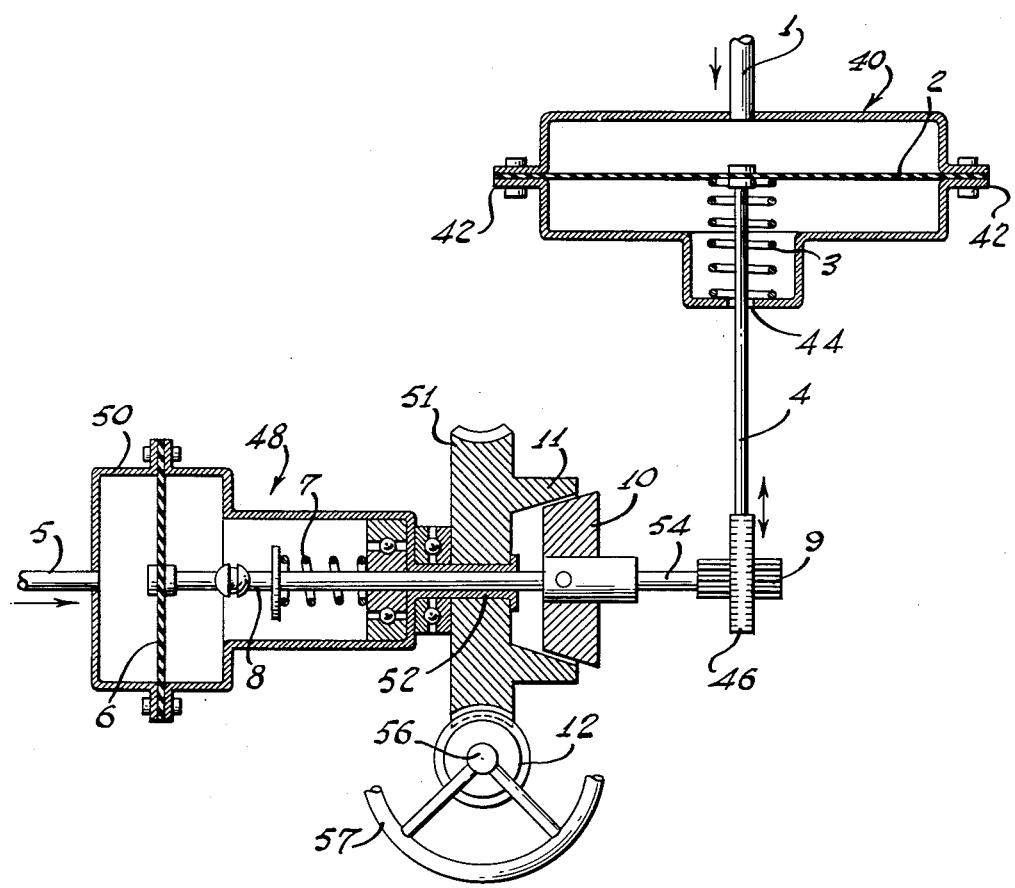
INVENTOR
*Heinz Gena*
BY
ATTORNEYS United States Patent Office 3,000,232
Patented Sept. 19, 1961

3,000,232
LOCKING CONTROL DEVICE
Heinz Gena, Leuna, Germany, assignor to VEB Leuna-Werke "Walter Ulbricht," Leuna, Germany
Filed July 27, 1960, Ser. No. 45,733
3 Claims. (Cl. 74—531)

This invention relates in general to control devices and in particular to a new and useful control device for locking a pneumatic or hydraulic control element in a given position of its operation.

In the art relating to regulation or control mechanisms it is often required that an element which is used for setting a certain position in an apparatus such as an amplifier, regulator, measuring feeler, and the like, be locked in the position it happens to be in whenever disruption of the operation of the device occurs due for example to failure in the pneumatic circuit or interruption of an electrical circuit. In many cases of failure it is also desirable and even necessary that during the time in which the disturbance prevails, manual operation can be carried out. Such manual operation may be required by the change of positions which is brought about in the controlled mechanisms.

In electrical setting devices in which an electric motor serves for effecting the setting action, self locking transmission members such as gear spindles or worm drives are used for producing a linear setting movement. In such cases the locking of the various drives in a certain position does not pose a problem, since, upon failure of electric energy, the rotation of a motor shaft is stopped and this results in stopping the member automatically in the position at which such failure occurs. In cases of this sort when it is desired to change the position of a particular member it can easily be brought about by placing a hand wheel control into operation on a setting spindle.

The present invention refers particularly to pneumatically or hydraulically operated setting mechanisms. Such mechanisms are constructed so that there is included a setting spindle which is moved linearly by means such as a piston or membrane of a setting motor. The spindle is displaced, for instance, until it reaches a stop, for example. In this manner the member driven by the spindle is also automatically moved unilaterally into an extreme position. Such a movement may lead to a critical condition of operation, for example, in chemical devices the continued movement of one of the elements of a control member, after a failure or a malfunctioning has occurred, may cause the chemical reaction to proceed to a dangerous state and result in a disastrous accident.

Prior to the present invention, it has been known to employ means for locking a member in a desired position by arresting an adjusting spindle when a disturbance such as a reduction in pressure in an air control line occurs, but in such instances the means include clamping, or detention of the hydraulic means to fix it in the position in which it was at the time of breakdown, such as indicated in U.S. Patent No. 2,339,469, for example. In these locking mechanisms, a resetting by hand is not possible.

In accordance with the present invention, there is provided a control mechanism which is an improvement over the above-mentioned devices, particularly in connection with the means for permitting arresting of an element in the condition at which a disturbance occurs and further including hand control means for adjusting the position manually, if such be desired.

Accordingly, it is an object of this invention to provide an improved control mechanism for locking pneumatic or hydraulic control elements in a given position.

A further object of the invention is to provide a control mechanism which is effective upon the failure of a pneumatic or hydraulic control system to immediately arrest a control member in its position of operation and which includes means for adjusting such position manually.

A further object of the invention is to provide a device which is effective to arrest the movement of a spindle member by means of a gear drive connection which is locked upon the occurrence of a control failure, and further including means for adjusting the position of the members and gear drive for resetting the device.

A further object of the invention is to provide a device for locking a pneumatic or hydraulic control element which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

The sole figure of the drawing is a diagrammatic indication of a pneumatically operated locking device constructed in accordance with the invention.

The invention includes a pneumatic control mechanism including a housing generally designated 40 for a setting or adjusting motor, which in the present instance includes a membrane 2 which is supported in the center of the housing by flange extensions 42 on each side of the housing. Control air for the mechanism is admitted through a supply pipe 1 to the upper side of the membrane 2 and determines the position the latter will assume along with a return spring member 3 acting on the opposite side thereof.

An adjusting or positioning spindle 4 is connected to the membrane 2 and extends downwardly through an opening 44 in the housing. The spindle 4 is provided with a portion 46 having a straight set of teeth for meshing engagement with a gear or pinion 9 of a spindle positioning mechanism generally designated 48.

The positioning mechanism 48 includes a housing 50 having a control member in the form of a membrane 6 centrally dividing the interior thereof. Locking member control air is admitted through a pressure supply conduit 5 and acts on the membrane 6 to control the position of the latter along with a return spring 7 acting on the opposite side thereof. This opposite side of the membrane 6 is connected to a clutch shaft 8 upon which is mounted a male conical clutch member 10 which is engageable with a second, female frusto-conical clutch member 11. The clutch member 11 is formed integrally with a worm wheel 51. The worm wheel 51 and the clutch member 11 are rotatably mounted on a hollow sleeve 52 and are freely rotatable except when the clutch members 10 and 11 are in engagement. When the control mechanism including the positioning spindle 4 is operating satisfactorily, the worm wheel 51 rotates freely.

In accordance with the invention, the pinion 9 which meshes with the straight teeth on the spindle portion 46 is secured to the outer end of a shaft 54. When a failure in the control pressure occurs which would cause a reduction in pressure in the supply conduit 5, the membrane 6 is displaced to the left by the spring 7 and this causes the clutch members 10 and 11 to become engaged to effect locking of the shaft 54 interconnecting the shaft 8 and the pinion 9. This effects locking of the spindle 4 in the position in which the failure occurs.

In accordance with the invention, a shaft 56 is rotatably mounted at right angles to the clutch shaft 8 and it is provided with a worm 12 which is in meshing engagement with the worm wheel 51. A positioning hand wheel 57 is advantageously affixed to the shaft 56 so that the worm wheel 51 may be actuated by rotating the shaft 56. Rotation of the worm wheel 51 when the clutch members 10 and 11 are in engagement, such as when a failure has occurred, will permit repositioning of the various parts including the spindle 4 by driving through the pinion 9.

In some instances it is preferable to employ a piston in place of the membrane 2 and in such a case the piston would be biased upwardly either by a spring such as the spring 3 or by fluid or air pressure. The membrane 6 may also be replaced by a piston and may be biased either by fluid pressure or by the spring pressure as shown at 7.

While a specific embodiment of the invention has been shown and described in detail to illustrate the application of the invention principles, it will be understood that the invention may be embodied otherwise without departing from such principles.

What is claimed is:

1. A device for locking a pneumatic or hydraulic movable positioning member in a given position upon failure of the pneumatic or hydraulic source of control pressure, comprising a control member, a shaft member connected to said control member and axially movable therewith, means for biasing said shaft member and said control member in one direction, means for directing control pressure against said control member to maintain it in equilibrium against said biasing, said shaft member including a first clutch member thereon, gear means connecting said shaft member and said movable positioning member, and hand rotatable positioning means including a second clutch member disposed for engagement with said first clutch member upon failure of said control pressure and movement of said control member under the force of said biasing means.

2. A device for locking a positioning member according to claim 1, wherein said hand rotatable positioning means comprises a worm wheel freely rotatable about said shaft and including said second clutch member thereon, and a worm engageable with said worm wheel.

3. A device for locking a positioning member according to claim 1, wherein said movable positioning member comprises an adjustable membrane, means for directing control pressure against one side of said membrane and means to bias the opposite side thereof.

References Cited in the file of this patent

UNITED STATES PATENTS

| | | |
|---|---|---|
| 2,513,453 | Conner | July 4, 1950 |
| 2,742,123 | Exline | Apr. 17, 1956 |
| 2,746,588 | Bryson | May 22, 1956 |
| 2,804,186 | Keir et al. | Aug. 27, 1957 |